(12) United States Patent
Sachan (10) Patent No.: US 9,592,814 B2
(45) Date of Patent: Mar. 14, 2017

(54) VALVE ASSEMBLY FOR RAIL VEHICLES AND PNEUMATIC SYSTEM INCLUDING SAME

(71) Applicant: Firestone Industrial Products Company, LLC, Indianapolis, IN (US)

(72) Inventor: Naveen S. Sachan, Gurgaon (IN)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 50 days.

(21) Appl. No.: 14/405,606

(22) PCT Filed: Jun. 4, 2013

(86) PCT No.: PCT/US2013/044089
§ 371 (c)(1),
(2) Date: Dec. 4, 2014

(87) PCT Pub. No.: WO2013/184666
PCT Pub. Date: Dec. 12, 2013

(65) Prior Publication Data
US 2015/0128826 A1    May 14, 2015

Related U.S. Application Data

(63) Continuation of application No. 61/655,088, filed on Jun. 4, 2012.

(51) Int. Cl.
*B60T 15/18* (2006.01)
*B61H 13/00* (2006.01)
(Continued)

(52) U.S. Cl.
CPC .......... *B60T 15/185* (2013.01); *B60T 13/365* (2013.01); *B60T 13/665* (2013.01); *B60T 13/683* (2013.01);
(Continued)

(58) Field of Classification Search
CPC .... B60T 13/665; B60T 15/185; B60T 13/365; B60T 13/683; F16K 11/0716; B61H 13/00; Y10T 137/8671; Y10T 137/86879
(Continued)

(56) References Cited

U.S. PATENT DOCUMENTS 1,736,021 A    11/1929  Thomas
3,169,801 A *  2/1965  Racki .................... B60T 8/1893
                                                              303/1

(Continued)

OTHER PUBLICATIONS

International Search Report and Written Opinion for corresponding PCT Application No. PCT/US2013/044089 dated Nov. 11, 2013.

*Primary Examiner* — Thomas J Williams
*Assistant Examiner* — Mariano Sy
(74) *Attorney, Agent, or Firm* — Thomas R. Kingsbury; Fay Sharpe LLP (57) ABSTRACT

A valve assembly is dimensioned for interconnection between a pressurized gas supply system and a pressurized gas braking system of a rail vehicle. The valve assembly can include a valve housing and a valve body. The valve housing can include a housing wall that at least partially defines a housing chamber and includes a plurality of communication ports in fluid communication with the housing chamber. The valve body is supported within the housing chamber for sliding movement relative to the housing wall. The valve body can be displaced between a plurality of positions in which different ones of the communication ports are in fluid communication with one another. A pressurized gas system and a rail vehicle are also included.

20 Claims, 7 Drawing Sheets

(51) Int. Cl.
   *B60T 13/36* (2006.01)
   *B60T 13/68* (2006.01)
   *F16K 11/07* (2006.01)
   *B60T 13/66* (2006.01)

(52) U.S. Cl.
   CPC .......... B61H 13/00 (2013.01); F16K 11/0716 (2013.01); *Y10T 137/8671* (2015.04)

(58) Field of Classification Search
   USPC .................. 303/7, 40, 33, 69, 117.1, 118.1; 137/625.5, 625.48, 625.69
   See application file for complete search history.

(56) References Cited

U.S. PATENT DOCUMENTS

| | | | | |
|---|---|---|---|---|
| 3,530,897 A * | 9/1970 | Buchanan | ............... | F15B 13/08 137/625.25 |
| 3,799,200 A * | 3/1974 | Tipton | ................. | E21B 19/084 137/625.6 |
| 3,861,761 A * | 1/1975 | Siebold | ................... | B60T 15/24 303/52 |
| 3,952,775 A * | 4/1976 | Ogata | ...................... | F16K 11/07 137/625.38 |
| 4,187,717 A * | 2/1980 | Wilhelm | ................. | G01M 3/26 73/46 |
| 4,187,884 A * | 2/1980 | Loveless | ............... | F16K 11/065 137/625.66 |
| 4,548,238 A * | 10/1985 | Chorkey | ............. | F16K 11/0655 137/625.25 |
| 4,776,648 A * | 10/1988 | Newton | ................ | B60T 8/1893 303/2 |
| 5,163,478 A * | 11/1992 | de Fries | .............. | F15B 13/0402 137/625.25 |
| 5,358,315 A * | 10/1994 | Balukin | ................ | B60T 13/585 303/15 |
| 5,503,467 A * | 4/1996 | Gaughan | ................. | B60T 15/42 303/128 |
| 5,613,741 A | 3/1997 | Shank | | |

* cited by examiner

VALVE ASSEMBLY FOR RAIL VEHICLES AND PNEUMATIC SYSTEM INCLUDING SAME

This application is the National Stage of International Application No. PCT/US2013/044089, filed on Jun. 4, 2013, which claims the benefit of priority from U.S. Provisional Patent Application No. 61/655,088 filed on Jun. 4, 2012, the subject matter of which is hereby incorporated herein by reference in its entirety.

BACKGROUND

The subject matter of the present disclosure broadly relates to the art of rail vehicles and, more particularly, to a valve assembly that can be interconnected between a pneumatic supply system and a pneumatic braking system of a rail vehicle. A pneumatic system for rail vehicles is also included.

The subject matter of the present disclosure is capable of broad application and use in connection with a variety of applications and/or environments. However, the subject matter finds particular application and use in conjunction with rail vehicles, and will be described herein with particular reference thereto. However, it is to be appreciated that the subject matter of the present disclosure is amenable to use in connection with other applications.

Conventional pneumatic systems for rail vehicles typically include both a pneumatic supply system and a braking system that often includes one or more pneumatically operated braking functions. The pneumatic supply system can be used to transfer pressurized gas to a variety of systems and/or components, such as pneumatic suspension systems, lubrication systems, cleaning systems and/or sand dispensing systems, for example. As such, rail vehicles typically include a compressed-gas generating device that can supply both a main reservoir line as well as a dedicated brake line.

Notwithstanding the common usage and overall success of conventional systems, it is believed beneficial to develop a valve assembly and a corresponding pneumatic system that may promote interoperability between pneumatic supply systems and braking systems, such as may be useful to improve performance, for example, and/or that may promote communication with operation and/or maintenance personnel in connection with certain pressurized gas loss conditions.

BRIEF DESCRIPTION

One example of a valve assembly in accordance with the subject matter of the present disclosure that is dimensioned for interconnection between an associated pressurized gas supply system and an associated pressurized gas braking system of an associated rail vehicle is provide. The valve assembly can include a valve housing and a valve body. The valve housing can include a housing wall that at least partially defines a housing chamber having a chamber length. The valve housing can also include at least first, second, third, fourth and fifth communication ports in fluid communication with the housing chamber and arranged such that the second and third communication ports are disposed in spaced relation to one another in a lengthwise direction and the first communication port is disposed between the second and third communication ports in the lengthwise direction. The valve body can have a longitudinal length and can include an intermediate body portion and first and second outer body portions that project lengthwise in opposing directions from along the intermediate body portion. The valve body can be supported on the valve housing within the housing chamber for sliding movement in the lengthwise direction relative to the housing wall such that the valve body can be displaced between first, second and third positions. In a first condition of the valve assembly, the valve body is in the first position and the first communication port is fluidically isolated from the fourth and fifth communication ports. In a second condition of the valve assembly, the valve body is in one of the second and third positions and the first communication port is in fluid communication with at least one of the fourth and fifth communication ports.

One example of a pressurized gas system in accordance with the subject matter of the present disclosure is provide for use on an associated rail vehicle having an associated plurality of wheels and a pressurized gas braking system operatively associated with the associated plurality of wheels. The pressurized gas system can include a pressurized gas supply line extending along the associated rail vehicle and including a first supply line connection and a second supply line connection. A pressurized gas brake line can be in fluid communication with the associated pressurized gas braking system and can include a first brake line connection. A valve assembly according to the foregoing paragraph can provided and the first brake line connection can be fluidically connected to the first communication port, the first supply line connection can be fluidically connected to the second communication port, and the second supply line connection can be fluidically connected to the third communication port. Under circumstances in which the first and second supply line connections experience pressurized gas values that are approximately equal in magnitude, the valve assembly can be disposed in the first condition. Under circumstances in which the first and second supply line connections experience pressurized gas values that exceed a predetermined differential pressure threshold, the valve assembly can be disposed in the second condition.

One example of a rail vehicle in accordance with the subject matter of the present disclosure is provided and can include a vehicle body as well as a plurality of rail bogies supporting the vehicle body that include a plurality of wheels. A pressurized gas system can extend along the vehicle body and can include a pressurized gas braking system that can be operatively associated with at least one of the plurality of wheels of at least one of the plurality of rail bogies and can include a pressurized gas brake line including a first brake line connection. A pressurized gas supply system can include a pressurized gas supply line and can include a first supply line connection and a second supply line connection. A valve assembly according to the above paragraph can be provided with the first brake line connection being fluidically connected to the first communication port, the first supply line connection being fluidically connected to the second communication port, and the second supply line connection being fluidically connected to the third communication port. Under circumstances in which the first and second supply line connections experience pressurized gas values that are approximately equal in magnitude, the valve assembly can be disposed in the first condition. Under circumstances in which the first and second supply line connections experience pressurized gas values that exceed a predetermined differential pressure threshold, the valve assembly can be disposed in the second condition.

DETAILED DESCRIPTION

Figure 1:
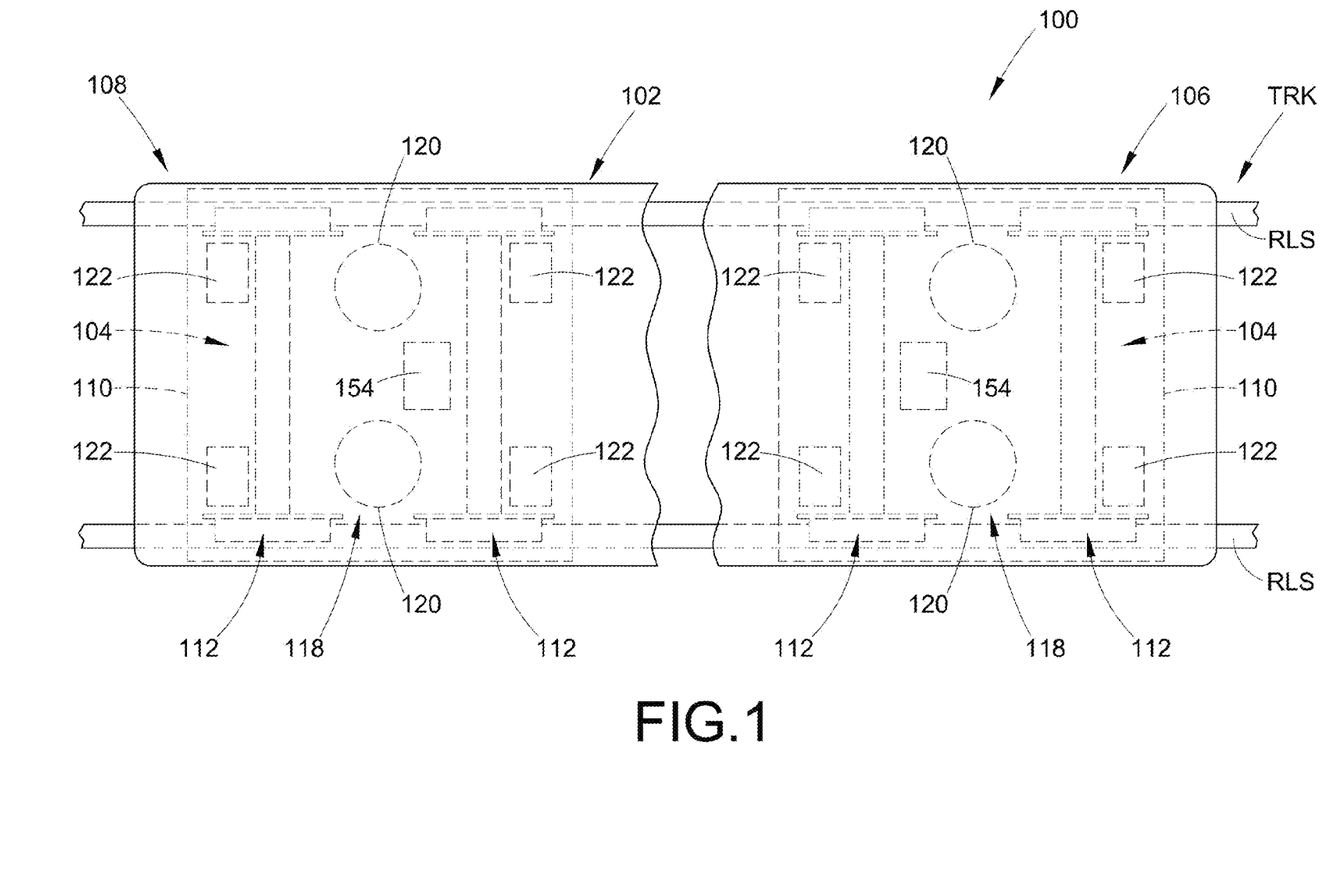
FIG. 1 is a schematic representation of one example of a rail vehicle including a pneumatic system in accordance with the subject matter of the present disclosure.

Turning now to the drawings, wherein the showings are for the purpose of illustrating exemplary embodiments of the present novel concept and not for the purpose of limiting the same, FIG. 1 illustrates one example of a rail vehicle 100 that is adapted for movement or otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Figure 2:
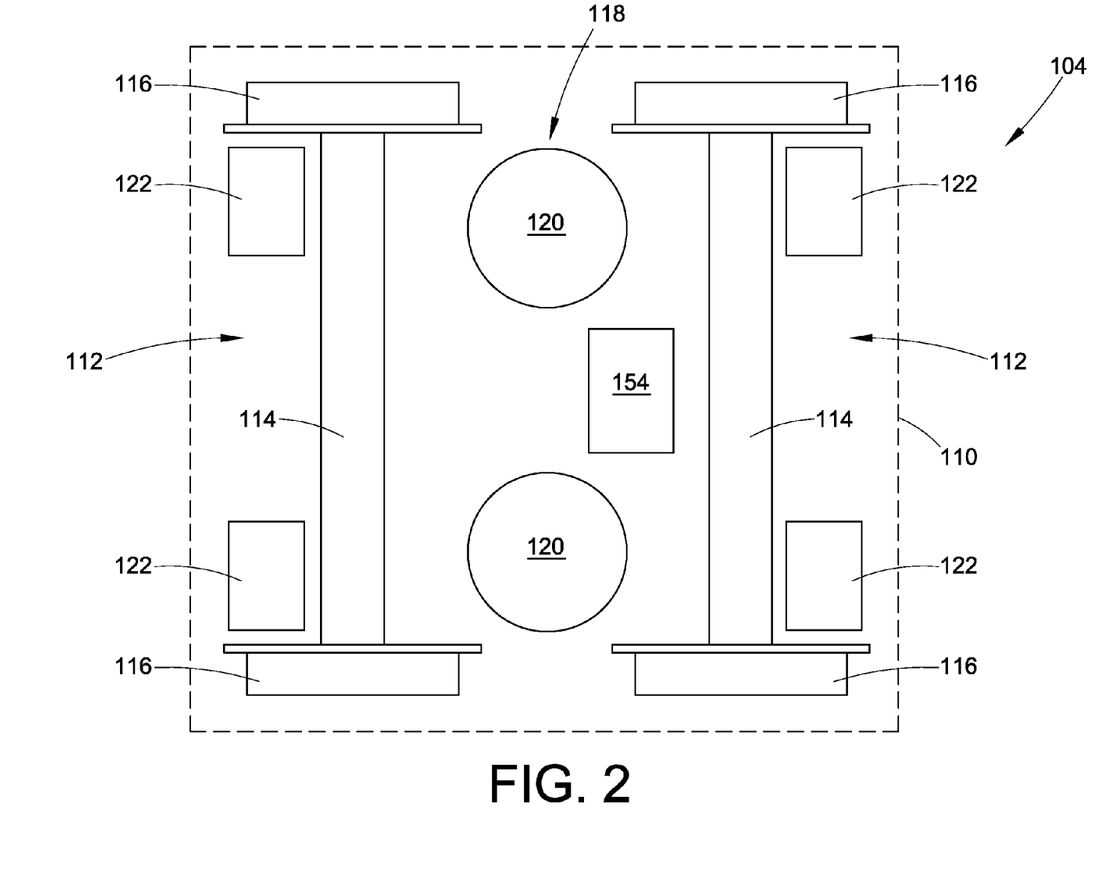
FIG. 2 is a schematic representation of the exemplary wheel and frame assembly of the rail vehicle in FIG. 1.

As shown in FIGS. 1 and 2, bogies 104 include a frame 110 as well as one or more wheel sets 112 that are typically formed by an axle 114 and a pair of spaced-apart wheels 116. Normally, bogies 104 include at least two wheel sets, such as is shown in FIGS. 1 and 2, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly. In the exemplary arrangement shown in FIGS. 1-3, bogies 104 include two gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIGS. 1 and 2, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Terms such as "pneumatic," "pneumatically," "pneumatic system," "pneumatic line," and the like are typically associated with systems and components that utilize air as a working fluid or medium, and it will be appreciated that rail vehicles traditionally utilize air as the working fluid of such systems and components. However, it will be recognized and understood that the subject matter of the present disclosure is capable of broad use in connection with other gaseous working fluids. As such, gases other than air could be used in connection with the subject matter of the present disclosure, and the subject matter of the present disclosure can be more broadly characterized and claimed using terms such as "pressurized gas," "pressurized gas system," "pressurized gas lines," and the like. Accordingly, it is to be recognized and understood that the use of such terms in addition to or as an alternative to terms such as "pneumatic," "pneumatically," "pneumatic system," "pneumatic line," and the like is fully supported by the present disclosure.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 3:
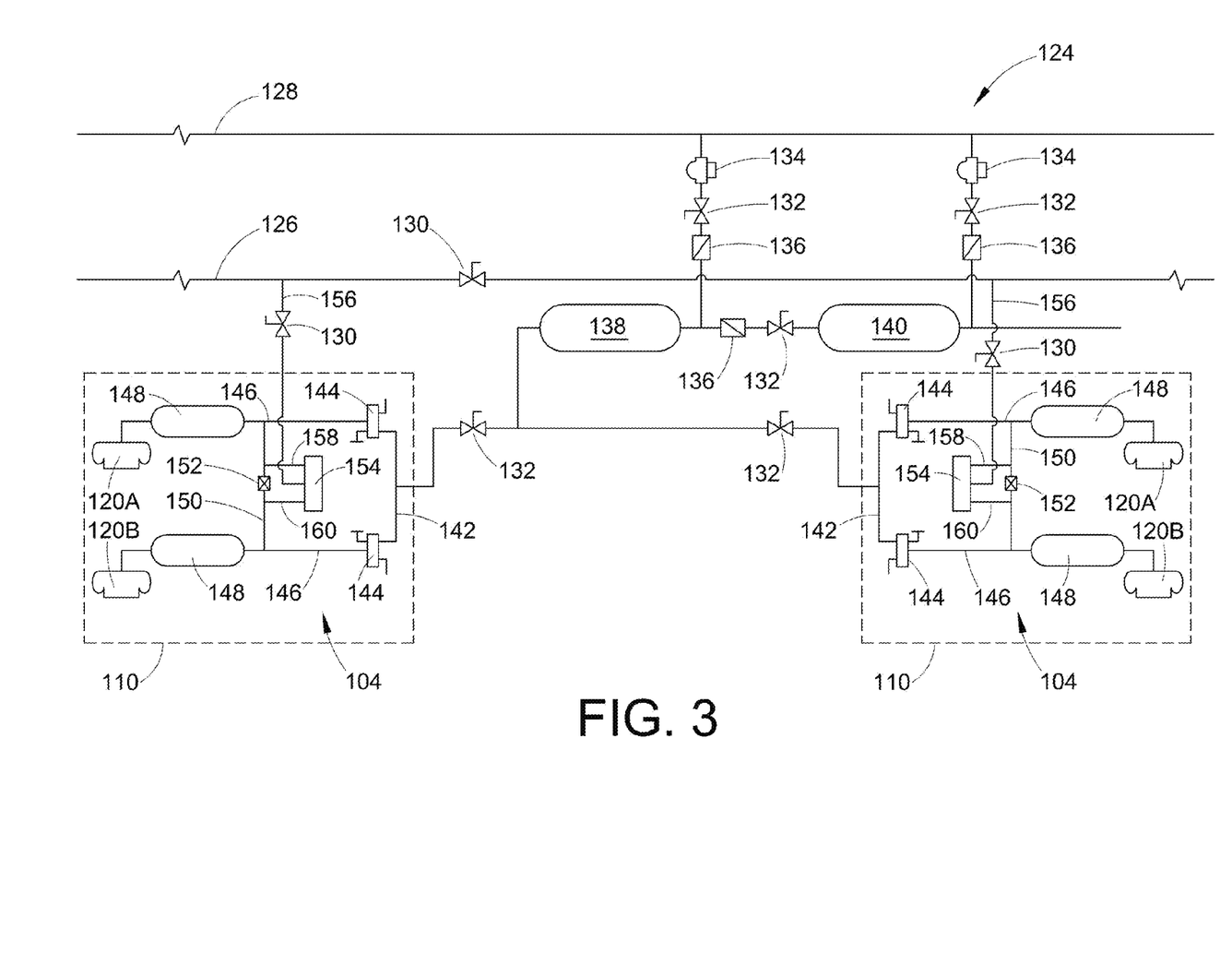
FIG. 3 is a schematic representation of one example of a pneumatic system in accordance with the subject matter of the present disclosure.

FIG. 3 illustrates one example of a pneumatic system 124 that is operatively associated with rail vehicle 100 and includes a braking system (not numbered) with a brake pipe (which may also be referred to as a brake line) 126 in fluid communication with at least brakes 122 and a pneumatic supply system (not numbered) with a supply pipe (which may also be referred to as a supply line) 128 in fluid communication with at least gas spring assemblies 120 of secondary suspension system 118. Brake pipe 126 and supply pipe 128 can extend along rail vehicle 100 and can have respective opposing ends (not identified) and couplers or connectors (not shown) disposed on or along the opposing ends.

It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 3, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 fluidically interconnect bogies 104 with the pneumatic supply system. Supply lines 142 are fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas line 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 3, for example.

A pneumatic system of a rail vehicle in accordance with the subject matter of the present disclosure can also include one or more control devices that are fluidically interconnected with both the braking system and the pneumatic supply system. Such one or more control devices can be supported on or along the vehicle body or a frame and wheel assembly thereof, and can be operative to induce application of the brakes of the rail vehicle upon the occurrence of a pressurized gas loss in the pneumatic supply system.

In the exemplary arrangement shown in FIGS. 1-4, pneumatic system 124 includes a valve assembly 154 that is operatively disposed or otherwise supported on or along each of bogies 104. Valve assemblies 154 are fluidically interconnected to both the braking system and the pneumatic supply system of pneumatic system 124, and can be fluidically interconnected therewith in any suitable manner. For example, in the arrangement shown in FIGS. 3 and 4, valve assemblies 154 are shown as being in fluid communication with brake pipe 126 by way of a brake communication line 156 along which along which isolation valve 130 is operatively disposed. Valve assemblies 154 are also shown as being in fluid communication with supply pipe 128 by way of spring communication lines 158 and 160 that respectively fluidically communicate with gas spring assemblies 120A and 120B, as shown in FIG. 3, such as by way of cross-flow line 150 and gas lines 146, for example.

Brake communication line 156 and spring communication lines 158 and 160 can be operatively connected with valve assembly 154 in any suitable manner. As one example, valve assembly 154 can include a housing 162 that includes a plurality of fluid communication ports with corresponding securement features for operatively connecting the communication lines and/or other components and devices to the housing. In the arrangement shown in FIGS. 4-7, for example, housing 162 includes a housing wall 164 that at least partially defines a housing chamber 166. As identified in FIG. 5, housing wall 164 also includes ports 168, 170 and 172 that are dimensioned for operative connection with communication lines 156, 158 and 160, respectively. Housing wall 164 can also, optionally, include one or more additional ports, such as ports 174, 176, 178 and/or 180, for example.

It will be appreciated that ports 168-180 can be constructed in any suitable manner. As one example, port 168 and ports 174 and 176 are shown as being at least partially defined or otherwise formed by, optional, connector fittings 182 and 184, respectively. The connector fittings each include a fitting body 186 and 188, respectively, that is attached to housing 162 in a suitable manner. As one example, a threaded connection 190 can be used in which each component includes at least one helical thread (not numbered). In this manner, the fitting bodies can be threadably interconnected to the housing. In a preferred arrangement, a substantially fluid-tight connection is provided and maintained between the fitting bodies and the housing, which can be achieved in any suitable manner. As one example, sealing elements 192 can be sealingly disposed between the housing and a corresponding one of the fitting bodies.

The one or more connector fittings, such as connector fittings 182 and 184, for example, if provided, can include one or more gas line connection features that are dimensioned and/or otherwise suitable for interconnecting with the communication lines and/or other components and devices. In some cases, for example, push-to-connect style fittings could be provided on or along the connector fittings for forming a substantially fluid-tight connection with one of the communication lines and/or other components or devices. In other cases, for example, one or more helical threads 194 could be included on or along the connector fitting with the one or more helical threads being dimensioned to form a threaded connection with a corresponding threaded fitting on one of the communication lines and/or other components or devices.

As indicated above, it will be appreciated that ports 168-180 can be constructed in any suitable manner. As another example, ports 170, 172, 178 and 180 are shown as being at least partially defined or otherwise formed by housing wall 164. As discussed above, it will be appreciated that ports 170, 172, 178 and/or 180 can include one or more gas line connection features that are dimensioned and otherwise suitable for interconnecting with the communication lines and/or other components and devices. In some cases, for example, push-to-connect style fittings could be provided on or along the housing wall for forming a substantially fluid-tight connection with one of the communication lines and/or other components or devices. In other cases, for example, one or more helical threads 196 could be included on or along the housing wall with the one or more helical threads being dimensioned to form a threaded connection with a corresponding threaded fitting on one of the communication lines and/or other components or devices.

Housing wall 164 includes an inner surface 198 that at least partially defines housing chamber 166 of housing 162, which is in fluid communication with one or more of ports 168-180 through openings (not numbered) along the inner surface. Inner surface 198 is shown in FIGS. 4-7 as having a generally circular cross-sectional shape and an elongated length that extends between connector fittings 184 such that housing chamber 166 is generally cylindrical in overall shape. It will be appreciated, however, that other configurations and/or arrangements could alternately be used. For example, one or more radially-inwardly and/or one or more radially-outwardly extending shoulder walls could be included. In such case, such one or more shoulder walls could at least partially define corresponding one or more chamber sections respectively having smaller or larger cross-sectional sizes.

Valve assembly 154 also includes a valve body 200 that is at least partially received within housing chamber 166 and displaceable in the lengthwise direction of the housing chamber relative to housing wall 164. Valve body 200 includes an intermediate body portion 202 and outer body portions 204 and 206 that are disposed along opposing ends of the intermediate body portion and project outwardly therefrom in a lengthwise direction. Intermediate body portion 202 includes an outer surface (not numbered) that has a cross-sectional shape that is dimensioned for sliding clearance with inner surface 198 of the housing chamber, as is represented by reference dimension D1 in FIG. 5. In some cases, one or more slide bushings and/or sealing elements 208A and 208B can be operatively disposed between intermediate body portion 202 and housing wall 164, such as by being at least partially received within endless annular grooves (not shown) extending radially-inwardly into the intermediate body portion.

In some cases, the outer body portions can be of different sizes, shapes and/or configurations relative to one another. In other cases, however, the outer body portions can be of substantially the same size, shape and configuration as one another, such as is illustrated in FIGS. 4-7, for example. Outer body portions 204 and 206 are shown as having at least approximately the same length and at least approximately the same cross-sectional dimension, as is respectively represented in FIG. 5 by reference dimensions L1 and D2.

Housing chamber 166 has an elongated length and extends in the lengthwise direction between opposing end surfaces 210. In some cases, the end surfaces may be at least partially defined by the housing wall. In other cases, however, such as is shown in FIGS. 4-7, for example, end surfaces 210 can be formed from other components and/or elements, such as connector fittings 184, for example. Additionally, housing chamber 166 can, in some cases, optionally include one or more recesses. In some cases, the recesses may be at least partially defined by the housing wall. In other cases, however, the one or more recesses can be formed into other components and/or elements. As one example, connector fittings 184 are shown in FIGS. 4-7 as including recess walls 212 that at least partially define recesses 214 that extend lengthwise into the connector fittings from along end surfaces 210. Outer body portions 204 and 206 of valve body 200 each have an outer surface (not numbered) that is dimensioned for sliding engagement with recess walls 212 and are each shown as being at least partially received within one of recesses 214.

As indicated above, valve body 200 is displaceable in the lengthwise direction of housing chamber 166 relative to housing wall 164. As such, recesses 214 are preferably of at least sufficient depth to permit the valve body to travel between opposing outward positions. In some cases, recesses 214 may include a bottom wall (not numbered) that at least partially defines a depth (not identified) of the recess in the lengthwise direction. In such cases, such depth is preferably of sufficient distance to permit a gap or space to be formed between the end (not numbered) of the outer body portions and the bottom wall of the recess, such as is represented by reference dimension GAP in FIG. 5, for example. In the exemplary arrangements shown, gaps GAP are of approximately equal dimension. Additionally, the recesses can directly fluidically communicate with ports 174 and 176. Alternately, recesses 214 can be in fluid communication with the ports by way of a passage 216 extending therebetween. It will be appreciated, however, that other arrangements and/or configurations could alternately be used.

Housing 162 includes one or more passage surfaces (not numbered) that at least partially define a corresponding number of one or more passages extending between or otherwise providing fluid communication between port 168 and housing chamber 166. In the arrangement shown in FIGS. 4-7, two passages 218A and 218B extend through housing wall 164 such that pressurized gas from brake communication line 156 can fluidically communicate with housing chamber 166 and/or valve body 200. It will be recognized that passages 218A and 218B are spaced apart from one another in the lengthwise direction.

Figure 4:
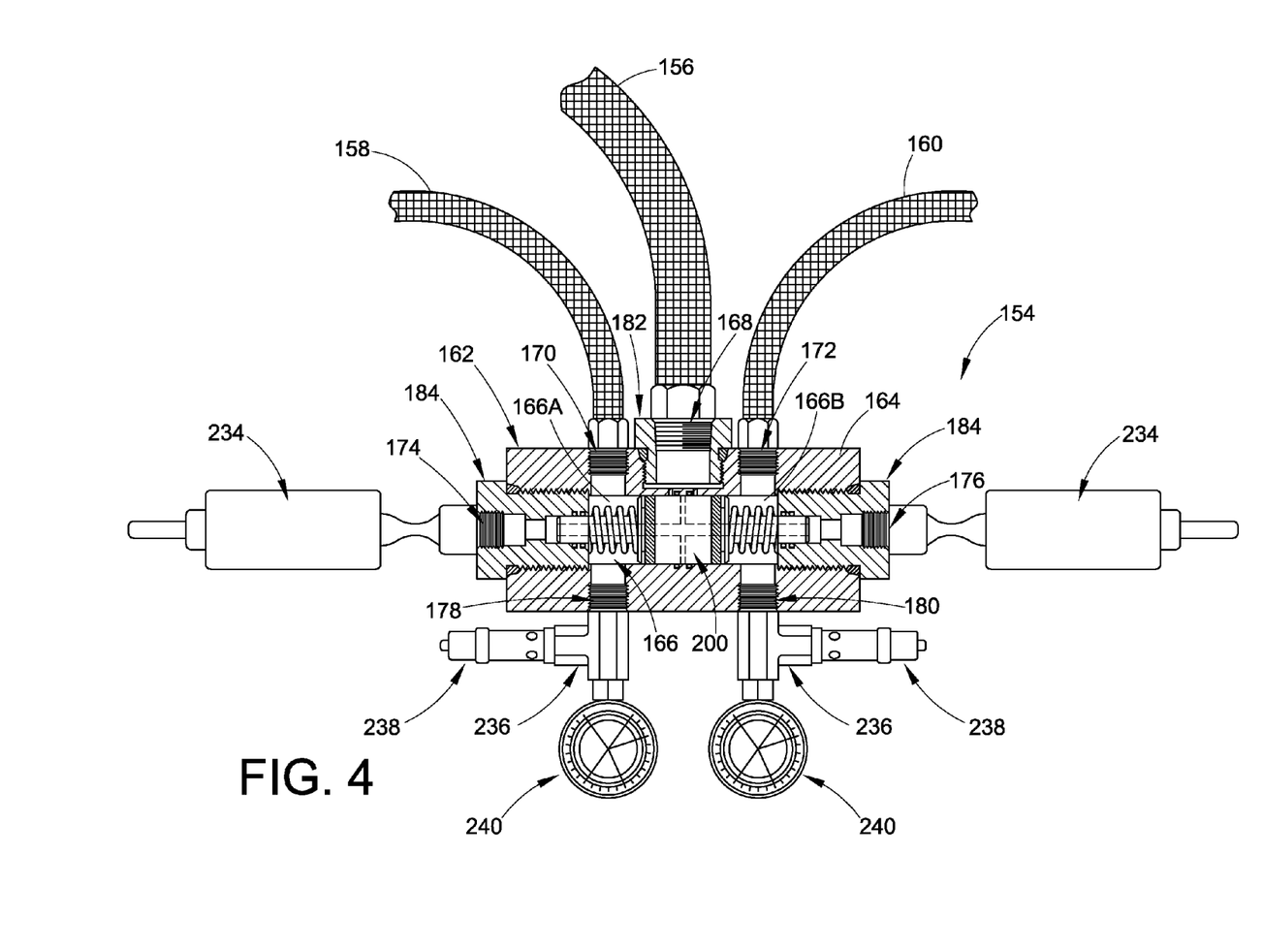
FIG. 4 is a side view, in partial cross-section, of one example of a valve assembly in accordance with the subject matter of the present disclosure shown connected to gas lines of the pneumatic system in FIG. 3.
Figure 5:
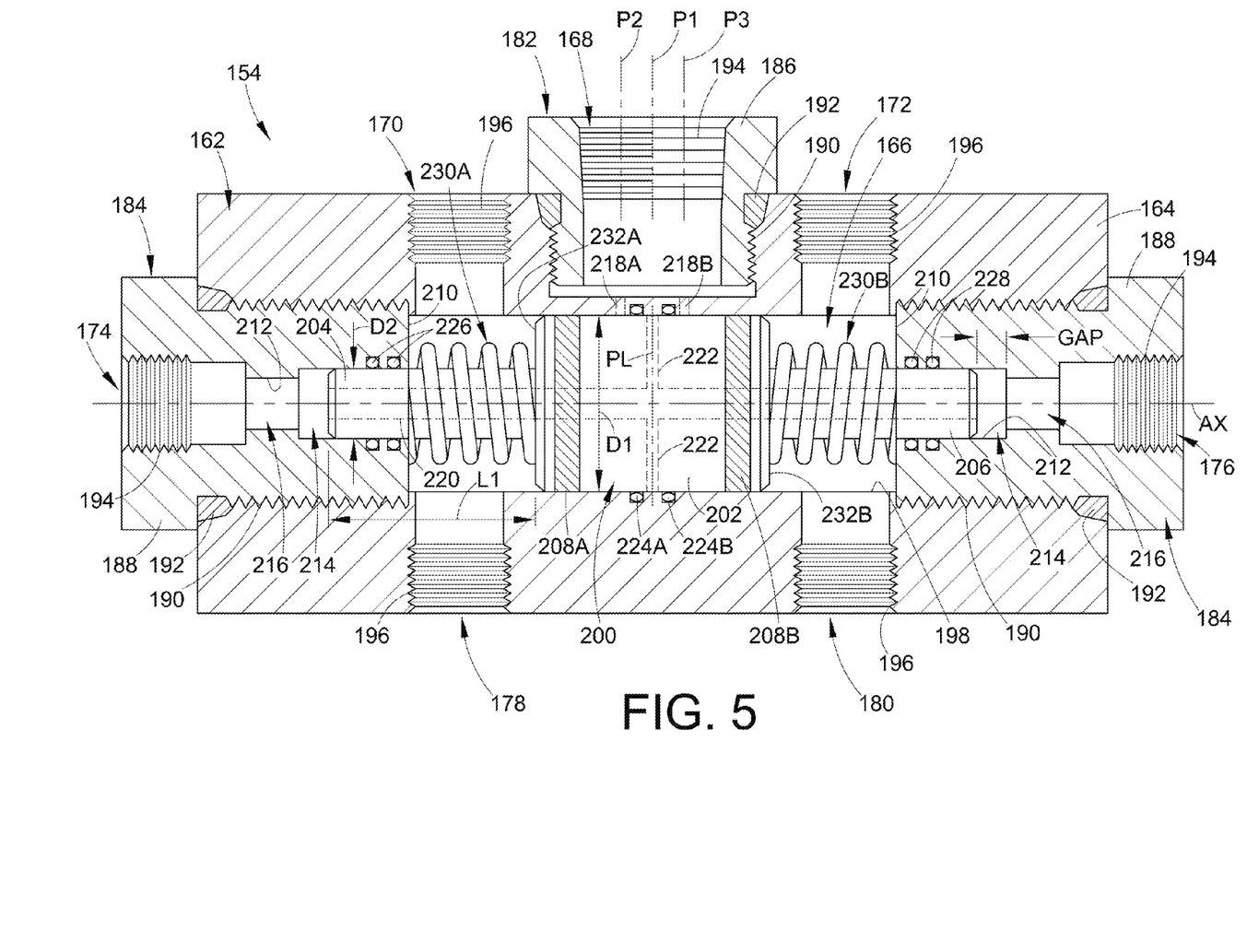
FIG. 5 is an enlarged side view of the valve assembly in FIG. 4 show without connected gas lines and other components.
Figure 6:
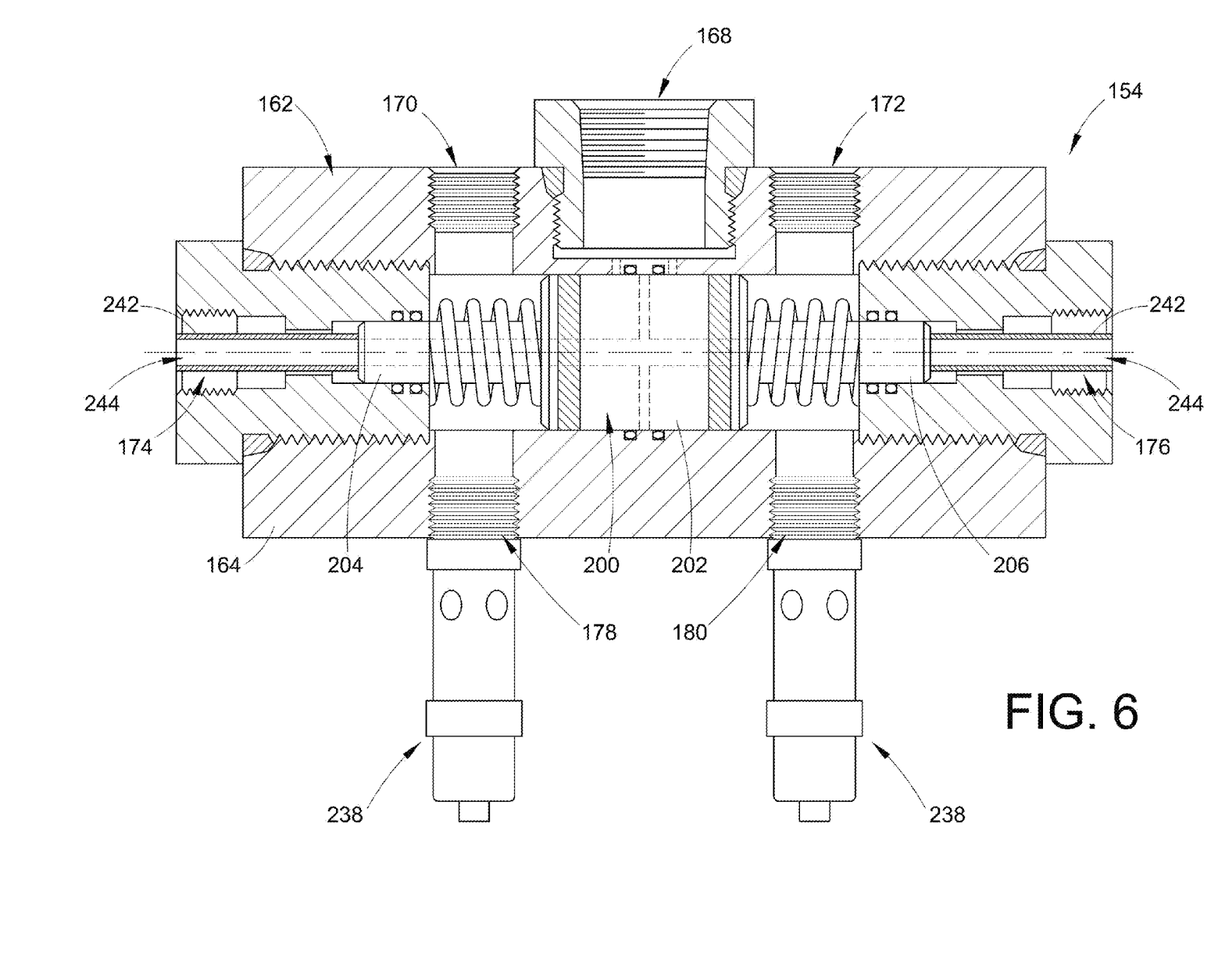
FIG. 6 is an enlarged side view illustrating an alternate embodiment of the valve assembly in FIG. 4.

Valve body 200 is shown in FIGS. 4-6 as including a transfer passage 220 that extends through the valve body in the lengthwise direction and includes passage openings (not numbered) disposed along the ends of outer body portions 204 and 206. One or more communication passages 222 extend between the outer surface of intermediate portion 202 and transfer passage 220 such that pressurized gas can fluidically communicate between the exterior of valve body 200 and the passage openings of transfer passage 220 through the one or more communication passages. In a preferred arrangement, the one or more communication passages are disposed in at least approximate alignment with one another in the lengthwise direction. That is, in a preferred arrangement, the one or more openings correspondingly formed by one or more communication passages 222 on or along the outer surface of intermediate body portion 202 are preferably disposed in at least approximate alignment with a plane PL extending through valve body 200 in a direction transverse to an axis AX that extends in the lengthwise direction.

Valve assembly 154 also includes a plurality of sealing elements that are disposed in sealing engagement between the valve body and the housing in any suitable manner. As one example, one or more sealing elements can be operatively disposed in sealing engagement between valve body 200 and housing 162, which can include one or more of housing wall 164 and/or connector fittings 182 and 184. In the arrangement shown in FIGS. 4-7, sealing elements 224A and 224B are disposed between housing wall 164 and intermediate body portion 202 such that a substantially fluid-tight seal is formed therebetween. Sealing elements 224A and 224B are disposed in spaced apart relation to one another in the lengthwise direction, and are shown as being positioned inboard (i.e., axially-inwardly) of passages 218A and 218B, respectively. It will be appreciated that sealing elements 224A and 224B can be of any suitable size, shape and/or configuration, and can be supported on or along either the housing or the valve body in any suitable manner. As one example, sealing elements 224A and 224B can take the form of endless annular elements that are at least partially formed from an elastomeric material that are at least partially received within endless annular grooves that extend radially outwardly into housing wall 166.

Additionally, one or more sealing elements can be operatively disposed in sealing engagement between the housing and the outer body portions of the valve body. For example, sealing elements 226 and 228 are shown as being respectively disposed between connector fittings 182 and 184 and outer body portions 204 and 206 such that substantially fluid-tight seals are respectively formed therebetween. Again, it will be appreciated that sealing elements 226 and 228 can be of any suitable size, shape and/or configuration, and can be supported on or along either the housing or the valve body in any suitable manner. As one example, the sealing elements can take the form of endless annular elements that are at least partially formed from an elastomeric material that are at least partially received within endless annular grooves that extend radially outwardly into connector fittings 182 and 184.

Valve assembly 154 also includes one or more biasing elements that are operatively associated with valve body 200 and function to urge the valve body in one or more directions. It will be appreciated that the one or more biasing elements can be of any suitable type, kind, configuration and/or arrangement. In the exemplary arrangement shown in FIGS. 4-7, valve assembly 154 includes biasing elements in the form of compression springs 230A and 230B that are operatively disposed between end surfaces 210 and side surfaces 232A and 232B of intermediate body portion 202. In some cases, the biasing elements can be of differing sizes, shapes, lengths and/or constructions, and/or can have different spring rates. In other cases, however, the biasing elements can be substantially identical to one another, and can have substantially equal spring rates.

In the arrangement shown in FIGS. 4-7, for example, compression springs 230A and 230B are substantially identical to one another, and have substantially equal spring rates. As such, compression springs 230A and 230B bias valve body 200 in opposing directions and are operatively to orient the valve body in a centered or neutral position, which is represented in FIG. 5 by reference line P1. It will be recognized from FIGS. 4-7 that in neutral position P1, communication passages 222 are fluidically isolated from passages 218A and 218B by sealing elements 224A and 224B. Additionally, it will be recognized from the drawing figures that passages 218A and 218B are fluidically isolated from ports 170, 172, 178 and 180 by sealing elements 208A and 208B. As such, pressurized gas from the brake system (e.g., from brake pipe 126) is fluidically isolated from ports 170-180 when valve body 200 is in neutral position P1.

Additionally, it will be recognized from FIGS. 4-7 that ports 170 and 178 are in fluid communication with one another by way of a section 166A (FIG. 4) of the housing chamber, and ports 172 and 180 are in fluid communication with one another by way of a section 166B (FIG. 4) of the housing chamber. However, ports 170 and 178 are maintained in fluidic isolation from ports 172 and 180, such as by way of sealing elements 208A, 208B, 224A and/or 224B. As such, it will be appreciated that pressurized gas in fluid communication with the gas spring assembly operatively associated with spring communication line 158 will be in fluid communication section 166A of the housing chamber and act against side surface 232A of intermediate body portion 202. Pressurized gas in fluid communication with the gas spring assembly operatively associated with spring communication line 160 will be in fluid communication section 166B of the housing chamber and act against side surface 232B of intermediate body portion 202.

During use under normal conditions of operation, pressurized gas acting on gas spring assemblies 120A and 120B of secondary suspension system 118 will be delivered by the supply system and will have a nominal pressure value that is approximately equal in magnitude within spring communication lines 158 and 160 as well as in sections 166A and 166B of housing chamber 166. It will be appreciated, however, that dynamic pressure variations will occur within different portions of the secondary suspension system during use of the rail vehicle, and that these dynamic pressure variations will be fluidically communicated to sections 166A and 166B of the housing chamber. As such, the biasing elements (e.g., compression springs 230A and 230B) are preferably sized to maintain valve body 200 in neutral position P1 up to a predetermined pressure differential between sections 166A and 166B of the housing chamber.

In a preferred arrangement, the biasing elements are sized such that dynamic pressure variations fluidically communicated to sections 166A and 166B and respectively acting on side surfaces 232A and 232B result in valve body 200 being maintained in neutral position P1, such as is illustrated in FIGS. 4-6, for example. In the event that a gas pressure differential exceeding the predetermined threshold occurs, however, the combination of biasing force and higher gas pressure acting on one side of the valve body will overcome the combination of biasing force and lower gas pressure acting on the other side of the valve body. In such instances, the valve body will shift from neutral position P1 to a corresponding outboard position, such as are represented by outboard positions P2 and P3 in FIG. 5, for example.

Figure 7:
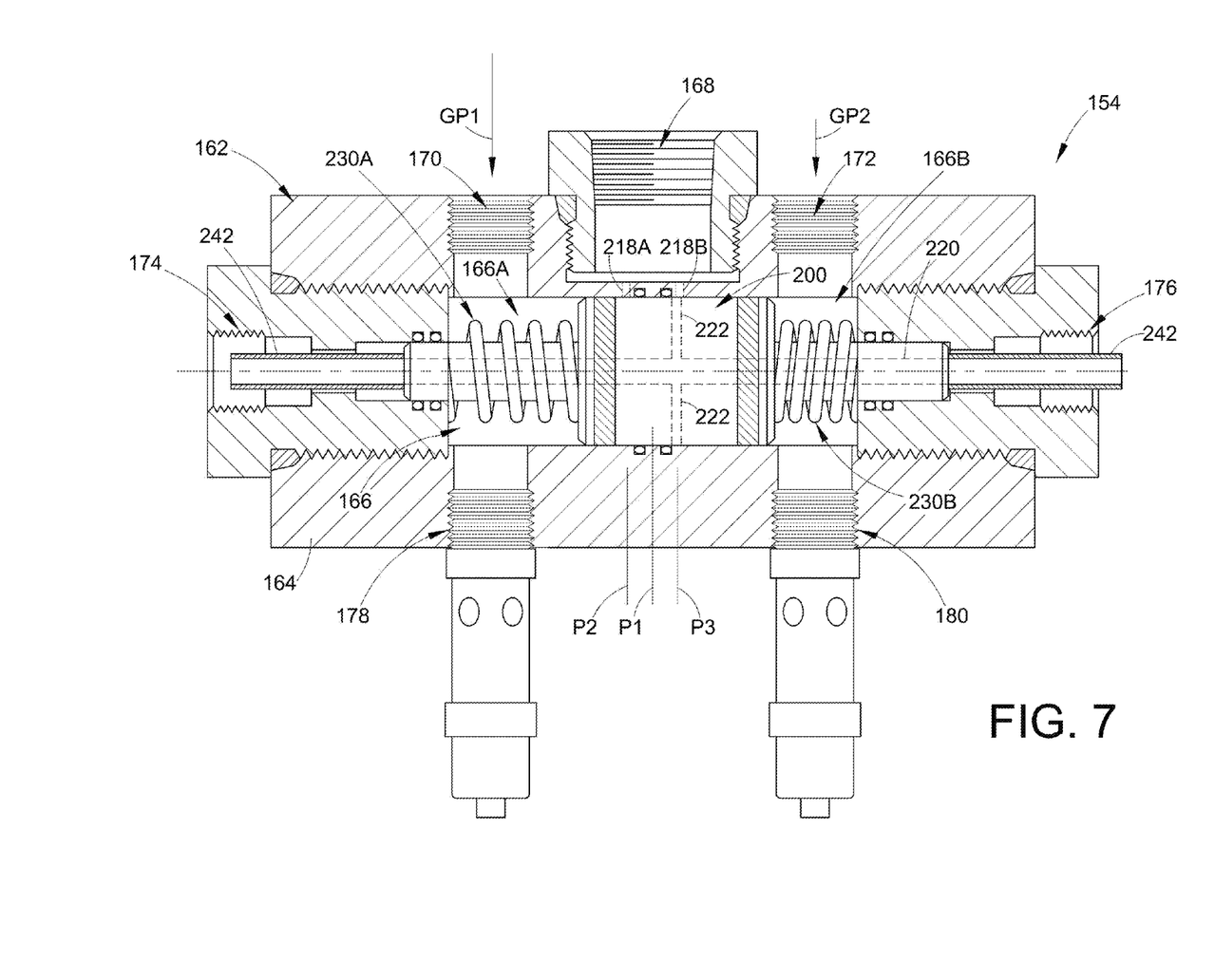
FIG. 7 is an enlarged side view of the embodiment of the valve assembly in FIG. 6 shown in an actuated condition.

As shown in FIG. 7, for example, a gas pressure is represented by arrow GP1 as being in fluid communication with section 166A and acting on side surface 232A, and a gas pressure is represented by arrow GP2 as being in fluid communication with section 166B and acting on side surface 232B. Gas pressure GP1 is represented as being greater than gas pressure GP2. Thus, valve body 200 is shown as being biased into outboard position P3 in which compression spring 230B is compressed and the gap or space represented by reference dimension GAP in FIG. 5 can be reduced or eliminated, such as is shown in FIG. 7, for example.

In outboard positions P2 and P3, one or more of communication passages 222 are placed in fluid communication with a one of passages 218A and 218B corresponding respectively to the outboard position of the valve body. As such, transfer passage 220 and, thus, ports 174 and 176 are placed in fluid communication with port 168 that is in fluid communication with the braking system (e.g., brake pipe 126). Accordingly, pressurized gas can be exhausted from the braking system of pneumatic system 124, which will initiate the application of brakes 122 of the rail vehicle in a manner well understood by those of skill in the art.

As mentioned above, pneumatic system 124 can also, optionally, include one or more additional components and/or devices, such as audible signaling devices, visual signaling devices and/or pneumatic flow control components. For example, valve assembly 154 is shown in FIG. 4 as including audible signal devices 234, such as air horns or whistles, for example, that are secured on housing 162 in fluid communication with ports 174 and 176. Upon displacement of valve body 200 from neutral position P1 to one of outboard positions P2 and P3, pressurized gas exhausted from the braking system can flow through devices 234 and generate an audible signal, such as may be useful for an operator or maintenance personnel to identify the general area of pressurized gas loss.

As another example, valve assembly 154 is shown in FIG. 4 as including T-fittings 236 that are secured on housing 162 in fluid communication with ports 178 and 180. Pressure relief valves 238 are secured along one leg of T-fittings 236 and visual signal devices 240, such as pressure gauges, for example, are secured along the remaining leg of T-fittings 236.

An alternate arrangement is shown in FIGS. 6 and 7 in which T-fittings 236 and visual signal devices 240 have been omitted and pressure relief valves 238 are secured on housing 162 in fluid communication with ports 178 and 180. Additionally, valve assembly 154 includes visual signal devices 242 that are supported along housing 162 and are displaceable relative thereto in cooperation with valve body 200. In neutral position P1 of valve body 200, visual signal devices 242 are disposed within the housing. However, upon displacement of valve body 200 into one of outboard positions P2 and P3, a corresponding one of visual signal devices 242 projects outwardly from a respective one of ports 178 and 180, such as is shown in FIG. 7, for example. In a preferred arrangement, visual signal devices 242 include a passage 244 extending therethrough that is in fluid communication with transfer passage 220 such that pressurized gas can be exhausted from the braking system of pneumatic system 124, such as has been discussed above in connection with operation of valve assembly 154 in the actuated conditions associated with outboard positions P2 and P3 of valve body 200 and the corresponding actuation of brakes 122 of the rail vehicle.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A valve assembly dimensioned for interconnection between an associated pressurized gas supply system and an associated pressurized gas braking system of an associated rail vehicle, said valve assembly comprising:
   a valve housing including a housing wall that at least partially defines a housing chamber having a chamber length, said valve housing also including at least first, second, third, fourth and fifth communication ports in fluid communication with said housing chamber and arranged such that said second and third communication ports are disposed in spaced relation to one another in a lengthwise direction and said first communication port is disposed between said second and third communication ports in said lengthwise direction, said valve housing including first and second passages extending in fluid communication between said first communication port and said housing chamber with said first and second passages being spaced apart from one another in said lengthwise direction; and,
   a valve body having a longitudinal length and including an intermediate body portion and first and second outer body portions that project lengthwise in opposing directions from along said intermediate body portion, said valve body supported on said valve housing within said housing chamber for sliding movement in said lengthwise direction relative to said housing wall such that said valve body can be displaced between first, second and third positions and such that:
      in a first condition of said valve assembly, said valve body is in said first position and said first communication port is fluidically isolated from said fourth and fifth communication ports; and,
      in a second condition of said valve assembly, said valve body is in one of said second and third positions and said first communication port is in fluid communication with at least one of said fourth and fifth communication ports.

2. A valve assembly according to claim 1, further comprising first and second biasing elements operatively associated with said valve body and biasing said valve body into said first position.

3. A valve assembly according to claim 2, wherein said first and second biasing elements have approximate equal spring rates and lengths that establish a predetermined differential pressure threshold for displacing said valve body into said second and third positions.

4. A valve assembly according to claim 1, wherein said intermediate body portion of said valve body includes a first side wall disposed adjacent said first outer body portion and a second side wall disposed adjacent said second outer body portion, said first and second side walls being spaced longitudinally from one another and at least partially define a longitudinal length of said intermediate body portion that is less than said chamber length of said housing chamber such that a first portion of said housing chamber is disposed along said first side wall of said intermediate body portion adjacent said second communication port and a second portion of said housing chamber is disposed along said second side wall of said intermediate body portion adjacent said third communication port and such that pressurized gas from said second communication port can act against said first side wall and pressurized gas from said third communication port can act against said second side wall.

5. A valve assembly according to claim 1, wherein said valve body includes a transfer passage extending in a lengthwise direction through said first outer body portion, said intermediate body portion and said second outer body portion between opposing open ends.

6. A valve assembly according to claim 1, wherein said intermediate body portion of said valve body includes an outer peripheral surface, and said valve body includes one or more communication passages extending into said intermediate body portion from along said outer peripheral surface.

7. A valve assembly according to claim 1, further comprising first and second sealing elements disposed between said intermediate body portion of said valve body and said housing wall of said valve housing, said first and second sealing elements disposed in spaced relation to one another in a longitudinal direction.

8. A valve assembly according to claim 1, wherein said housing wall of said valve housing at least partially defines a first recess extending outwardly in a first longitudinal direction from along said housing chamber and a second recess extending outwardly in a second, opposing longitudinal direction from along said housing chamber with said first outer body portion of said valve body at least partially received within said first recess and said second outer body portion of said valve body at least partially received within said second recess.

9. A valve assembly according to claim 1, further comprising at least one sealing elements disposed between said first outer body portion of said valve body and said valve housing and at least one sealing element disposed between said second outer body portion of said valve body and said valve housing.

10. A valve assembly according to claim 1, wherein said valve housing includes sixth and seventh communication ports in fluid communication with said housing chamber.

11. A valve assembly according to claim 1, further comprising at least one indicator in fluid communication with at least one of said fourth and fifth communication ports.

12. A valve assembly according to claim 11, wherein said at least one indicator includes at least one of a visual indicator and an audible indicator.

13. A pressurized gas system of an associated rail vehicle having an associated plurality of wheels and a pressurized gas braking system operatively associated with the associated plurality of wheels, said pressurized gas system comprising:
 a pressurized gas supply line extending along the associated rail vehicle and including a first supply line connection and a second supply line connection;
 a pressurized gas brake line in fluid communication with the associated pressurized gas braking system and including a first brake line connection; and,
 a valve assembly including:
  a valve housing that includes a housing wall that at least partially defines a housing chamber having a chamber length, said valve housing also including at least first, second, third, fourth and fifth communication ports in fluid communication with said housing chamber and arranged such that said second and third communication ports are disposed in spaced relation to one another in a lengthwise direction with said first communication port disposed between said second and third communication ports in said lengthwise direction; and,
  a valve body having a longitudinal length and including an intermediate body portion as well as first and second outer body portions that project lengthwise in opposing directions from along said intermediate body portion, said valve body supported on said valve housing within said housing chamber for sliding movement in said lengthwise direction relative to said housing wall such that said valve body can be displaced between first, second and third positions and such that:
   in a first condition of said valve assembly, said valve body is in said first position and said first communication port is fluidically isolated from said fourth and fifth communication ports; and,
   in a second condition of said valve assembly, said valve body is in one of said second and third positions and said first communication port is in fluid communication with at least one of said fourth and fifth communication ports;
  said first brake line connection being fluidically connected to said first communication port, said first supply line connection being fluidically connected to said second communication port, and said second supply line connection being fluidically connected to said third communication port;
 under circumstances in which said first and second supply line connections experience pressurized gas values that are approximately equal in magnitude, said valve assembly being disposed in said first condition; and,
 under circumstances in which said first and second supply line connections experience pressurized gas values that exceed a predetermined differential pressure threshold, said valve assembly being disposed in said second condition.

14. A pressurized gas system according to claim 13, wherein said valve housing includes first and second passages extending in fluid communication between said first communication port and said housing chamber, said first and second passages being spaced apart from one another in said lengthwise direction.

15. A pressurized gas system according to claim 13, wherein said intermediate body portion of said valve body includes a first side wall disposed adjacent said first outer body portion and a second side wall disposed adjacent said second outer body portion, said first and second side walls being spaced longitudinally from one another and at least partially define a longitudinal length of said intermediate body portion that is less than said chamber length of said housing chamber such that a first portion of said housing chamber is disposed along said first side wall of said intermediate body portion adjacent said second communication port and a second portion of said housing chamber is disposed along said second side wall of said intermediate body portion adjacent said third communication port and such that pressurized gas from said second communication port can act against said first side wall and pressurized gas from said third communication port can act against said second side wall.

16. A pressurized gas system according to claim 13 further comprising at least one indicator in fluid communication with at least one of said fourth and fifth communication ports.

17. A rail vehicle comprising:
a vehicle body;
a plurality of rail bogies supporting said vehicle body and including a plurality of wheels; and,
a pressurized gas system extending along said vehicle body and including:
  a pressurized gas braking system operatively associated with at least one of said plurality of wheels of at least one of said plurality of rail bogies and including a pressurized gas brake line including a first brake line connection;
  a pressurized gas supply system including a pressurized gas supply line including a first supply line connection and a second supply line connection; and,
  a valve assembly including:
    a valve housing including a housing wall that at least partially defines a housing chamber having a chamber length, said valve housing also including at least first, second, third, fourth and fifth communication ports in fluid communication with said housing chamber and arranged such that said second and third communication ports are disposed in spaced relation to one another in a lengthwise direction and said first communication port is disposed between said second and third communication ports in said lengthwise direction; and,
    a valve body having a longitudinal length and including an intermediate body portion and first and second outer body portions that project lengthwise in opposing directions from along said intermediate body portion, said valve body supported on said valve housing within said housing chamber for sliding movement in said lengthwise direction relative to said housing wall such that said valve body can be displaced between first, second and third positions and such that:
      in a first condition of said valve assembly, said valve body is in said first position and said first communication port is fluidically isolated from said fourth and fifth communication ports; and,
      in a second condition of said valve assembly, said valve body is in one of said second and third positions and said first communication port is in fluid communication with at least one of said fourth and fifth communication ports;
    said first brake line connection being fluidically connected to said first communication port, said first supply line connection being fluidically connected to said second communication port, and said second supply line connection being fluidically connected to said third communication port;
    under circumstances in which said first and second supply line connections experience pressurized gas values that are approximately equal in magnitude, said valve assembly being disposed in said first condition; and,
    under circumstances in which said first and second supply line connections experience pressurized gas values that exceed a predetermined differential pressure threshold, said valve assembly being disposed in said second condition.

18. A rail vehicle according to claim 17, wherein said valve housing includes first and second passages extending in fluid communication between said first communication port and said housing chamber, said first and second passages being spaced apart from one another in said lengthwise direction.

19. A rail vehicle according to claim 17, wherein said intermediate body portion of said valve body includes a first side wall disposed adjacent said first outer body portion and a second side wall disposed adjacent said second outer body portion, said first and second side walls being spaced longitudinally from one another and at least partially define a longitudinal length of said intermediate body portion that is less than said chamber length of said housing chamber such that a first portion of said housing chamber is disposed along said first side wall of said intermediate body portion adjacent said second communication port and a second portion of said housing chamber is disposed along said second side wall of said intermediate body portion adjacent said third communication port and such that pressurized gas from said second communication port can act against said first side wall and pressurized gas from said third communication port can act against said second side wall.

20. A rail vehicle according to claim 17 further comprising at least one indicator in fluid communication with at least one of said fourth and fifth communication ports.

* * * * *